United States Patent [19]

Kaku et al.

[11] Patent Number: 4,656,618
[45] Date of Patent: Apr. 7, 1987

[54] OPTICAL INFORMATION RECORDING AND REPRODUCING APPARATUS

[75] Inventors: Toshimitsu Kaku, Hachioji; Keiji Kataoka, Kawagoe; Yoshito Tsunoda, Mitaka; Kazuo Shigematsu, Saitama, all of Japan

[73] Assignee: Hitachi, Ltd., Tokyo, Japan

[21] Appl. No.: 639,004

[22] Filed: Aug. 9, 1984

[30] Foreign Application Priority Data

Aug. 26, 1983 [JP] Japan .................. 58-154855
Aug. 26, 1983 [JP] Japan .................. 58-154857

[51] Int. Cl.$^4$ .............................. G11B 7/125
[52] U.S. Cl. ........................ 369/112; 369/44
[58] Field of Search ............ 346/76 L; 360/114; 369/44, 45, 46, 109, 110, 111, 121, 122, 116; 350/358

[56] References Cited

U.S. PATENT DOCUMENTS

| | | | |
|---|---|---|---|
| 4,298,974 | 11/1981 | Tsunoda et al. | 369/45 |
| 4,363,116 | 12/1982 | Kleuters et al. | 369/44 |
| 4,449,212 | 5/1984 | Reno | 369/44 |
| 4,520,472 | 5/1985 | Reno | 369/122 |
| 4,566,088 | 1/1986 | Yoshida et al. | 369/44 |

Primary Examiner—Donald McElheny, Jr.
Attorney, Agent, or Firm—Antonelli, Terry & Wands

[57] ABSTRACT

In an optical information recording and reproducing apparatus having a laser light source and an optical system so that a beam from the laser light source is irradiated through the optical system on an information recording medium to record and reproduce information, an accousto-optic modulator is disposed in the optical system for receiving the beam from the laser light source, and a modulation unit is provided which comprises an oscillator for generating a plurality of signals at different frequencies, a modulator for modulating the outputs of the oscillator and an adder for adding together the outputs of the modulator.

20 Claims, 13 Drawing Figures

THREE DIFFRACTED BEAMS

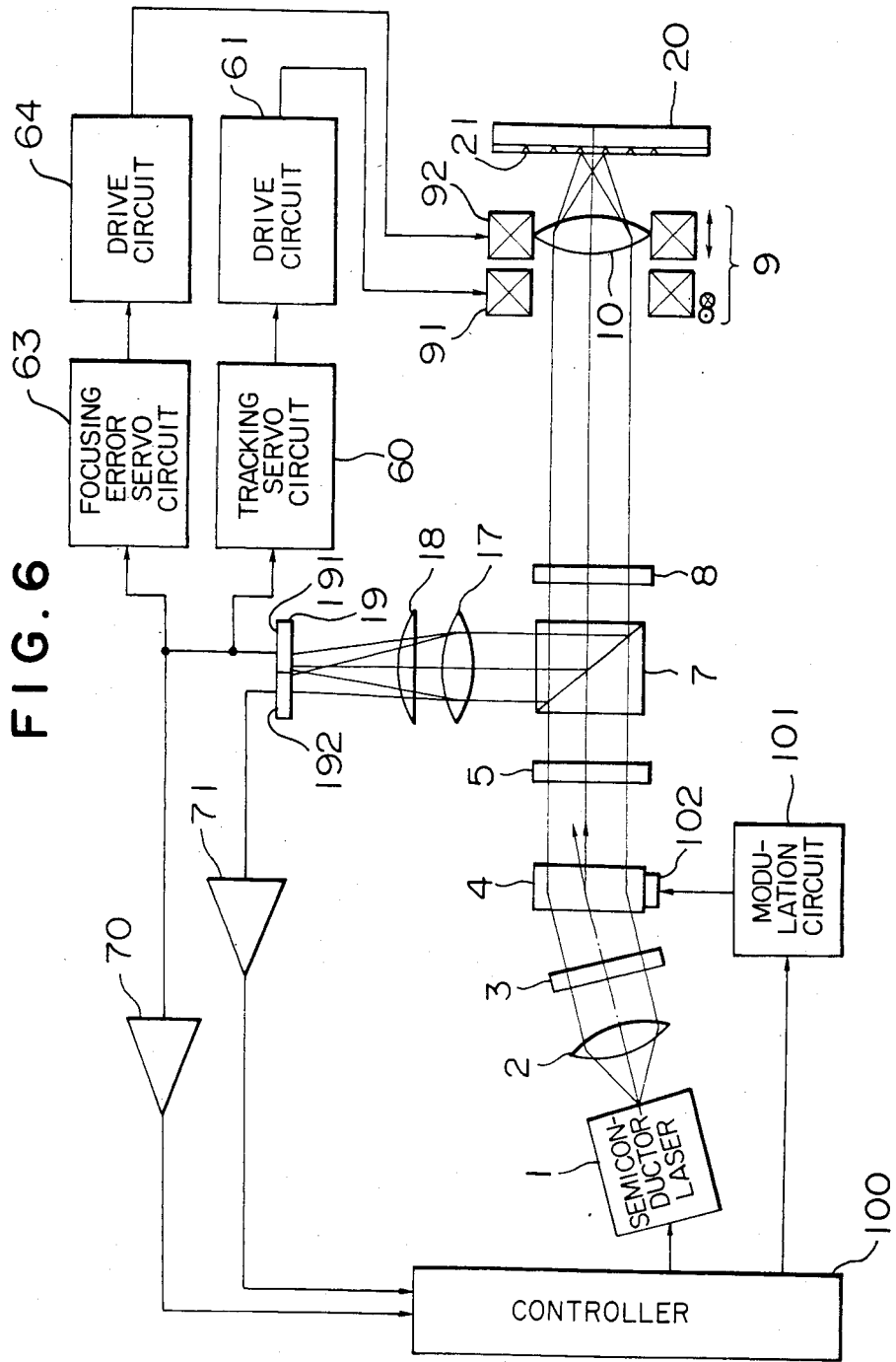

OPTICAL INFORMATION RECORDING AND REPRODUCING APPARATUS

BACKGROUND OF THE INVENTION

This invention relates to an optical information recording and reproducing apparatus which records information on an information recording surface by irradiating a laser beam thereon and/or reproducing the information from the information recording surface, and more particularly to an information recording and reproducing apparatus of the type suitable for use in an optical system in which simultaneous irradiation of a plurality of laser beams on an information recording surface is required or in an optical system in which laser beams of different shapes are required as necessary.

In recent years, an optical information recording and reproducing apparatus has been developed wherein a laser beam is irradiated on a disc-like record carrier with a helical track or concentric tracks having a data field and an address field so as to record information in the form of changes in optical characteristics such as surface unevenness, reflection factor or transmittivity along the track, and a change in the optical characteristics is detected to reproduce the information. This apparatus has many applications in various fields. Especially, in case where the recorded information is of digital data for use with a computer, the data is required of high reliability and must be subject to fast read and therefore, there needs a function to reproduce the information immediately after its recording for the sake of checking whether or not the information has been recorded correctly. This checking function is called a direct read during write check (DRDW), according to which a write beam and a read beam are irradiated on the same track at preceding and succeeding positions thereof so that immediately after information has been recorded with the write beam, the recorded information is reproduced with the read beam. In a prior art apparatus such as disclosed in Japanese Patent Application Laid-open No. 181441/82, two light sources of different wavelengths were used for simultaneous irradiation of the write and read beams. In this prior art apparatus using two laser light sources, however, fluxes of light from the two light sources are required to be incident on a focusing lens with one incident flux inclined with respect to the other at a very small angle in order that the write or recording beam spot can be positioned in close proximity to the read beam spot, and difficulties are encountered in achieving the fine angle adjustment. Further, temperature and vibration tend to disturb the positional relationship, thereby making it difficult to correctly record and reproduce the information.

For use in this type of optical information recording and reproducing apparatus, there have been developed a so-called write once type optical disc wherein information is recorded which takes the form of, for example, a hole locally formed by irradiating a laser beam on a recording thin film serving as the recording surface and in addition, an erasable optical disc wherein a recording film of, for example, chalcogenide material is used and the recording film is reversibly changed into a crystalline state or an amorphous state under irradiation of a laser beam to thereby provide rewritable information. In this erasable optical disc, a laser beam for recording or reproducing and a laser beam for erasing must be focused on the recording surface in different shapes, for example, a circular spot for the recording and reproducing laser beam and an elliptical spot for the erasing laser beam. Therefore, in this prior art apparatus, two light sources of different wavelengths respectively adapted for recording or reproducing and erasing are used for independent formation of the circular spot and the elliptical spot. Accordingly, this type of apparatus still faces problems that two light sources are required, that the positioning of the circular and elliptical spots is difficult to achieve, and that temperature and vibration tend to disturb the positional relationship between these spots, thereby preventing correct recording, reproducing and erasing of the information.

SUMMARY OF THE INVENTION

The present invention contemplates elimination of the above prior art problems and has for its object to provide an easily adjustable and highly reliable optical information recording and reproducing apparatus with a single laser light source.

To accomplish the above object, according to the present invention, a single laser light source and an acousto-optic modulator are used, various diffracted beams are produced as necessary from a laser beam emitted from the laser light source by means of the acousto-optic modulator, and these diffracted beams are focused on an information recording surface through the same optical system.

For example, when it is desired as in the erasable apparatus that differently shaped beam spots be focused on the information recording surface in accordance with the recording or reproducing mode and the erasing mode, the circular spot necessary for recording or reproducing is formed of a single diffracted beam based on a single frequency, and the elliptical spot necessary for erasing is formed of a plurality of diffracted beams based on a plurality of frequencies. When the simultaneous formation of the recording or write spot and the read spot is desired for realizing the DRDW function, two diffracted beams are formed on the basis of two different frequencies, one diffracted beam is pulse modulated to produce the recording spot, and the other diffracted beam is processed into a constant output serving as the reading spot.

BRIEF DESCRIPTION OF THE DRAWINGS

The present invention will be apparent from the following detailed description taken in conjunction with the accompanying drawings, in which:

FIG. 6 is a block diagram showing another embodiment of the apparatus according to the invention;

DETAILED DESCRIPTION OF THE PREFERRED EMBODIMENT

Figure 1:
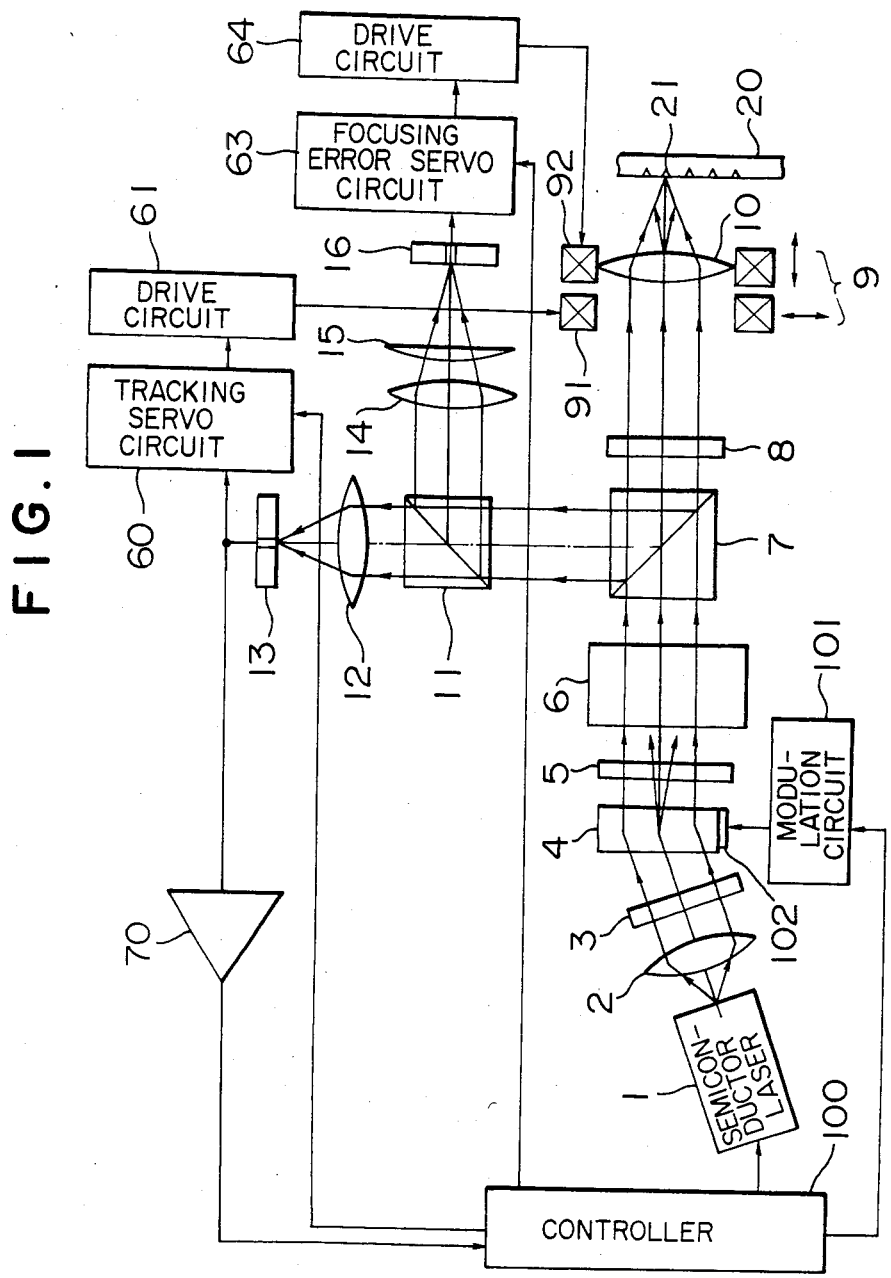
FIG. 1 is a block diagram showing an optical information recording and reproducing apparatus according to one embodiment of the invention.

Referring now to FIG. 1, there is illustrated, in block form, a preferred embodiment of an optical information recording and reproducing apparatus according to this invention. This embodiment incorporates an erasable optical disc carrier and a light source in the form of a semiconductor laser. A divergent beam of light emitted from a semiconductor laser 1 is converted into a parallel flux of light by means of a coupling lens 2 and comes into a first cylindrical lens 3. The flux of light from the semiconductor laser has, on account of characteristics of its light emitting region, a divergent angle in a longitudinal direction (vertical to the junction plane) which is different from a divergent angle in a lateral direction (parallel to the junction plane), whereby the divergent angle in the longitudinal direction is larger in general, providing an elliptical beam having an aspect ratio of, for example, 2-3:1. The elliptical laser beam remains unchanged in its shape after passage through the coupling lens 2. The cylindrical lens 3 is then adapted for constricting the elliptical beam in the minor axis direction so that the incident beam to an A/0 modulator 4 can be so depressed as to assist in improving switching characteristics of the A/0 modulator 4. This A/0 modulator 4 is placed substantially at a focal point of the cylindrical lens 3 and driven by a signal from a modulation circuit 101. When the signal produced from the circuit 101 is applied to a transducer 102, a single or a plurality of diffracted beams are produced.

Figure 2:
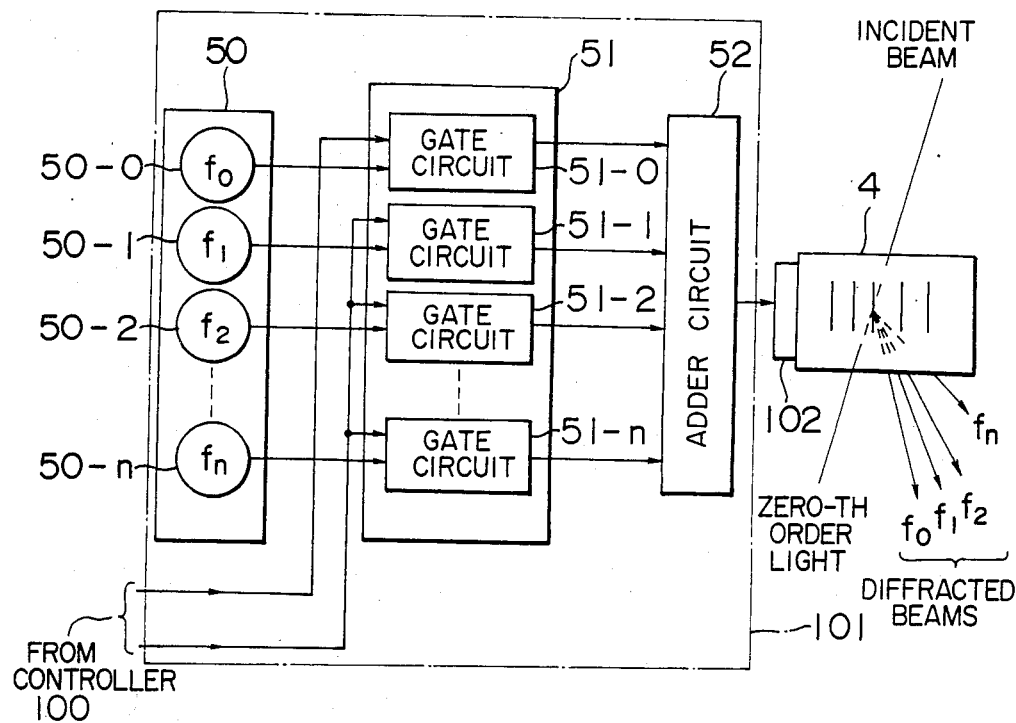
FIG. 2 is a block diagram showing the construction of a modulation circuit for driving an acousto-optic modulator (hereinafter referred to as an A/0 modulator) used in the apparatus of FIG. 1.

Referring to FIG. 2, the operation of the A/0 modulator 4 will now be described. The A/0 modulator 4 is made of an acousto-optic material such as $TeO_2$ or $PbMoO_4$, and an ultrasonic wave having a wavelength corresponding to a drive signal from the modulation circuit 101 is propagated through the material. The incident beam is diffracted in accordance with the ultrasonic wave and consequently, with the drive signal containing a plurality of frequencies simultaneously, a plurality of diffracted beams are produced. According to this embodiment, for recording/reproducing with the circular spot and erasing with the elliptical spot in the erasable optical disc, the circular spot is realized by a single diffracted beam in the recording and reproducing mode and the elliptical spot is realized by a pseudo elliptical spot consisting of a plurality of close diffracted beams in the erasing mode. The modulation circuit 101 comprises an oscillator unit 50 including an oscillation circuit 50-0 having a frequency $f_o$ for the recording beam and n oscillation circuits 50-1 to 50-$n$ having frequencies $f_1$ to $f_n$ respectively, for the erasing beam, a pulse modulation unit 51 including n+1 gate circuits 51-0 to 51-$n$ which are responsive to commands from a controller 100 to on-off switch outputs of the oscillator unit 50 and change their magnitudes independently, and an adder circuit 52 for adding together n+1 signals from the pulse modulation unit 51. The output of the modulation circuit 101 is applied to the transducer 102 which converts the input electrical signal into a mechanical vibration and then causes an ultrasonic wave to propagate through the acousto-optic material. In this manner, desired diffracted beams can be obtained. Since the outputs for the erasing beam from the n oscillation circuits are on-off switched simultaneously, it is not always necessary to provide the n gate circuits corresponding to the n oscillation circuits. For example, the outputs of these oscillation circuits may be added together and a resulting added signal may be on-off switched and changed in its magnitude. A beam component being not subject to diffraction and travelling in the same direction as the incident beam is called a zero-th order beam and is not used in this embodiment.

Returning to FIG. 1, the diffracted beam issued from the A/0 modulator 4 is reconstructed into an elliptical beam by a second cylindrical lens 5 having the same characteristics as the first cylindrical lens 3 and then shaped into a circular beam by a beam shaper 6 comprised of a prism or a cylindrical lens. If the characteristics of the cylindrical lens 5 are made different from those of the cylindrical lens 3 such that the ratio between focal lengths of both the cylindrical lenses is set to be equal to the aspect ratio of the light flux of the semiconductor laser, the beam shaper 6 may be dispensed with. The beam from the beam shaper is passed through a polarizing beam splitter 7 and a ¼ wavelength plate 8 and focused on a disc 20 by means of a focusing lens 10 associated with a two dimensional actuator 9. During recording or reproducing, only the gate circuit 51-0 is enabled and the A/0 modulator 4 is modulated by the output of the oscillation circuit 50-0 oscillating at frequency $f_0$ to produce a single diffracted beam which in turn is focused into a circular spot of about 1 $\mu$m diameter by means of the focusing lens 10 and focused on a pre-grooved track 21 formed on the disc 20. This disc 20 is constituted by a substrate made of glass or plastics, a recording film formed on the substrate and a protective film for protection of the recording film. The laser beam is focused on the recording film via the substrate or protective film to record or reproduce information. The recording film exemplified herein is made of a chalcogenide family material which has such a characteristic that a reversible change is effected between a crystalline state and an amorphous state, thereby making the recorded information erasable. More particularly, in order to record the information, the drive current of the semiconductor laser 1 is pulse modulated by the controller 100 and a short-duration light beam pulse of high intensity thus produced is irradiated on the recording film to rapidly heat and cool the recording film locally to thereby bring it into the amorphous state which is of an optical state of low reflection factor. The drive signal of the semiconductor laser 1 during recording contains the pulse signal and a DC signal superimposed thereon which makes the level for recording equal to that for reproducing and is used not only for recording but also for reading a track address, detecting a focusing error indicative of an amount of vertical swinging of the disc and detecting a tracking error indicative of an amount of eccentricity of the disc as will be described later. In addition to the gate circuit 51-0, another gate circuit may of course be enabled during recording as in another embodiment to be described later to cause the A/0 modulator 4 to produce two diffracted beams, thereby achieving the DRDW function.

Figure 3:
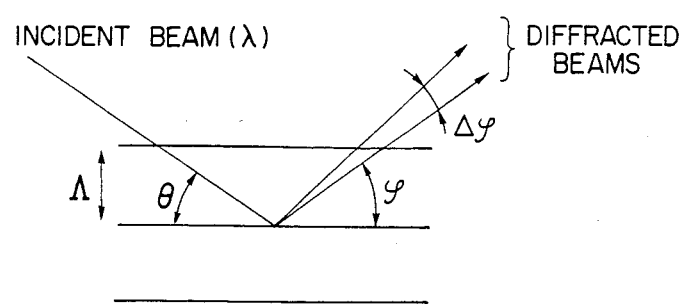
FIG. 3 is a diagram useful in explaining the operational principle of the A/0 modulator.
Figure 4A:
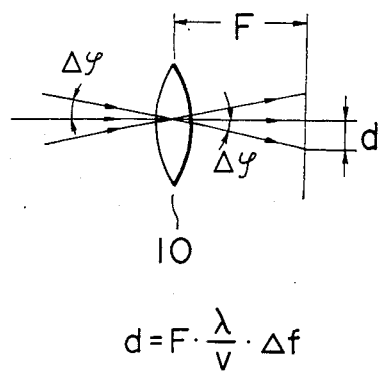
FIGS. 4A and 4B are digrams for explaining focusing characteristics of a plurality of beams.
Figure 4B:
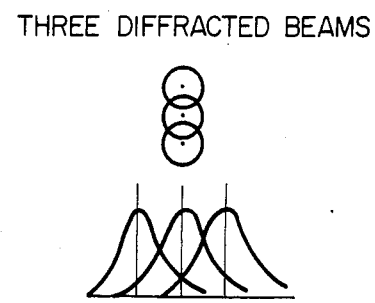

During erasing, on the other hand, the gate circuits 51-0 to 51-$n$ are enabled to operate the A/0 modulator 4 with a plurality of frequencies, and a pseudo elliptical spot consisting of a plurality of close spots is obtained as will be described with reference to FIG. 3 and FIGS. 4A and 4B. To describe the operational principle of the A/0 modulator, reference should first be made to FIG. 3. A beam take-in angle $\theta$ and a beam take-off angle $\phi$ described in FIG. 3 are related to each other in accordance with equation (1):

$$\Lambda(\sin\theta + \sin\phi) = \lambda \quad (1)$$

where $\Lambda$ is the distance between adjacent standing waves in the material and $\lambda$ the wavelength of the beam. Since $\theta$ and $\phi$ are small angles, the equation (1) is usually reduced to, $$\Lambda(\theta + \phi) = \lambda \quad (2)$$

Denoting the drive oscillation frequency by f and the velocity in the acousto-optic material by v, $v = f\Lambda$ stands and the equation (2) is rewritten to, $$\Delta\phi = \frac{\lambda}{v}\Delta f \quad (3)$$

Accordingly, the take-off angle of the diffracted beam can be changed by $\Delta\phi$ when the oscillation frequency is changed by $\Delta f$. FIG. 4B shows focusing characteristics of a plurality of beams. Denoting the focal length of the focusing lens 10 by F, the center to center distance, d, between adjacent spots on the focal plane (recording surface) can be expressed as, $$d = F\Delta\phi = F \cdot \frac{\lambda}{v} \cdot \Delta f \quad (4)$$

Denoting the ratio between spot distance d and spot diameter D by K, the equation (4) can be reduced to, $$\Delta f = \frac{K \cdot v}{F \cdot NA} \quad (5)$$

Since the spot diameter D is represented by $\lambda/NA$ where NA is the numerical aperture of the lens 10. For example, when the elliptical spot is realized for $K = \frac{1}{2}$ on condition that, for example, F=4.5 mm, NA=0.5, and v=3630 m/sec (for PbMoO$_4$), $\Delta f$ is selected to be about 0.8 MHz. Under this condition, the spot diameter D is 1.66 $\mu$m for the wavelength $\lambda$ being 830 nm. Consequently, an elliptical spot having a major axis of 10 $\mu$m can be realized with eleven diffracted beams.

Figure 5A:
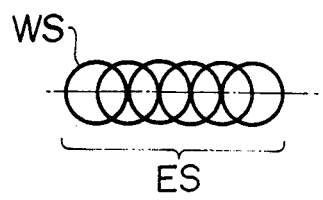
FIGS. 5A to 5E are diagrams showing the positional relation between the recording (reproducing spot (WS) and the erasing spot (ES)
Figure 5B:
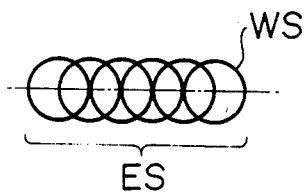
Figure 5C:
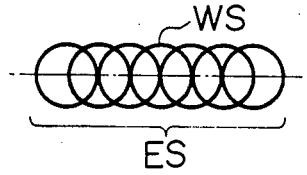
Figure 5D:
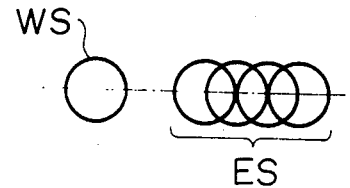
Figure 5E:
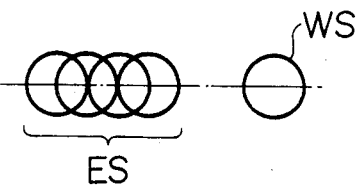

In this manner, during erasing, the elliptical spot is formed which gradually heats and cools the recording film to bring it into the crystalline state by which the recorded information is erased. This crystalline state has a high optical reflection factor. During erasing, the drive signal of the semiconductor laser contains the pulse of relatively large width and a DC signal superimposed thereon which makes the level for erasing equal to that for reproducing, thereby ensuring that the reproducing function can also be realized by the spot due to the diffracted beam used for recording and reproducing. In other words, the diffracted beam based on the oscillation frequency $f_o$ is also generated in the recording, reproducing and erasing modes. The positional relation between recording/reproducing spot WS and erasing spot ES is illustrated in FIGS. 5A to 5E where a chainned line represents the direction of tracking. Specifically, FIGS. 5A to 5C show the positional relationship wherein the individual spots are close to each other, and FIGS. 5D and 5E show the WS and ES which are separated from each other. Various types of the positional relationship as illustrated in FIGS. 5A to 5E can be realized by selecting a suitable frequency of each oscillation circuit included in the oscillator unit 50.

Returning to FIG. 1, the beam reflected from the disc 20 is returned through the focusing lens 10 and $\frac{1}{4}$ wavelength plate 8 and reflected at the polarizing beam splitter 7 so as to be directed to a detecting optical system. This reflected beam is split at a half mirror 11 into two components, one of which comes into a tracking error detecting system comprised of a lens 12 and a photodetector 13 and the other of which is directed to a focusing error detecting system comprised of a lens 14, a cylindrical lens 15 and a photodetector 16. The photodetector 13 is divided into two segments and receives a change in diffraction pattern of the spot WS corresponding to a tracking error to produce a differential output signal indicative of the detected tracking error and a cumulative output signal indicative of the information. The tracking error detection signal is fed to a tracking servo circuit 60 and then to a magnetic circuit 91 via a drive circuit 61. The magnetic circuit 91, included in the two dimensional actuator 9, functions to twist the focusing lens 10 in a tracking direction (radial direction of the disc) to thereby ensure following-up of the track. The tracking servo circuit 60 is responsive to the recording pulse signal and erasing pulse signal from the controller 100 to sample hold the tracking error detection signal, in order to eliminate influence of power changes and beam changes due to the pulses for recording and erasing. The information signal, represented by the cumulative output signal, is fed to the controller 100 via an amplifier 70 and reproduced as data. The photodetector 16 of the focusing error detection system is divided into four segments and receives a change in pattern corresponding to a focusing error to produce a focusing error detection signal. The focusing error detection signal is fed to a focusing error servo circuit 63 and then to a magnetic circuit 92 via a drive circuit 64. The magnetic circuit 92, included in the two dimensional actuator 9, functions to twist the focusing lens 10 in its optical axis direction to thereby perform auto-focusing. Like the tracking servo circuit 60, the focusing error servo circuit 63 is responsive to the recording pulse signal and erasing pulse signal from the controller 100 to sample hold the focusing error detection signal.

It is not always necessary that the semiconductor laser be driven by the pulse in the erasing mode but may be operated by DC driving in the case of FIGS. 5D and 5E. Under the DC drive, the sample hold operating is not required.

In place of the semiconductor laser used as the light source in the foregoing embodiment, a gas laser such as an argon laser may be used to attain the same effect as above. In contrast to the semiconductor laser, the beam shaper may be dispensed with and the modulator for the formation of the beam into the pulse can be unitary with the A/0 modulator 4 in the case of the gas laser. The types of the tracking detection system and the focusing error detection system are not limited to those described above but various types may be employed.

Referring to FIG. 6, another embodiment of the optical information recording and reproducing apparatus according to the present invention will be described. The apparatus to be described herein has the DRDW function. In FIG. 6, identical elements to those in FIG. 1 are designated by identical reference numerals.

Figure 7:
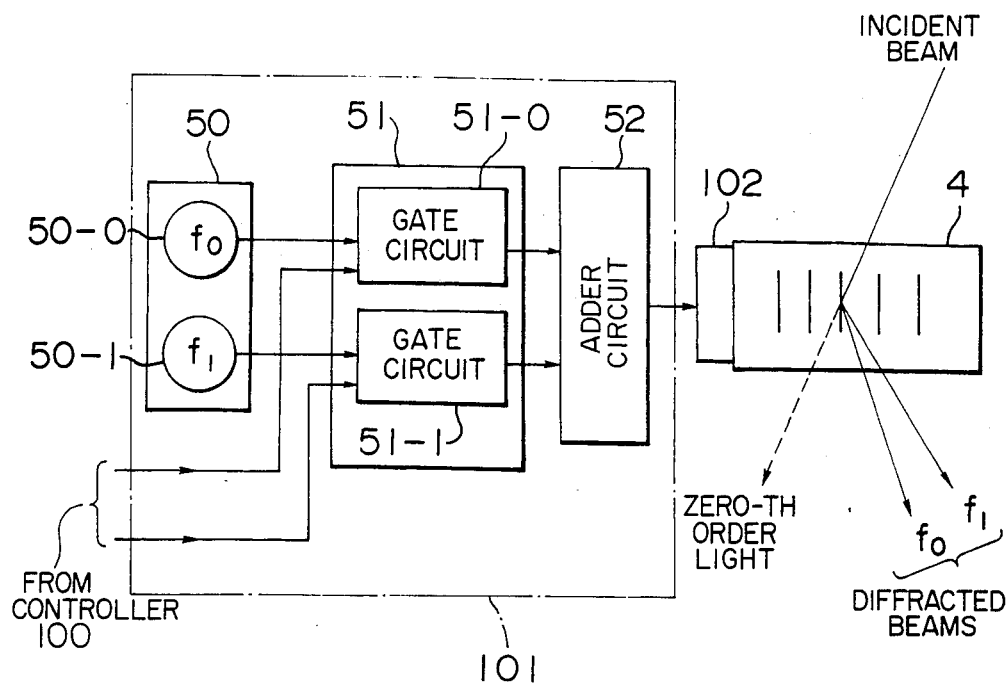
FIG. 7 is a block diagram showing the construction of a modulation circuit for driving an A/0 modulator used in the FIG. 6 apparatus.

Light emitted from a semiconductor laser 1 is converted into a parallel flux of light by a coupling lens 2 and comes into a cylindrical lens 3. The cylindrical lens 3 constricts the incident flux of light only in the minor axis direction, and the depressed beam comes into an A/0 modulator 4 which is placed substantially at a focal point of the cylindrical lens 3. In this embodiment, the A/0 modulator 4 produces two diffracted beams in the recording mode. The diffracted beams issued from the A/0 modulator 4 is passed through a second cylindrical lens 5, having a focal length which is a multiple of the focal length of the first cylindrical lens 3 by an aspect ratio (2 to 3 times) of the light flux of the semiconductor laser 1, so as to be converted into substantially circular beams. Thereafter, these beams are passed through a polarizing beam splitter 7 and a ¼ wavelength plate 8, and focused by a focusing lens 10 on a disc to form thereon two circular spots of about 1 μm diameter which are close to each other. In this embodiment, the simultaneous formation of a write spot and a read spot at preceding and succeeding positions of a track on an information recording surface is required during recording. Therefore, a modulation circuit 101 is constituted, as shown in FIG. 7, by an oscillator unit 50 including two oscillation circuits 50-0 and 50-1 respectively having a frequency $f_o$ for the write or record spot and a frequency $f_1$ for the read spot, a pulse modulation unit 51 including two gate circuits 51-0 and 51-1 which are responsive to commands from a controller 100 to pulse modulate outputs of the oscillation circuits 50-0 and 50-1 and change their magnitudes independently, and an adder circuit 52 for adding together outputs of the pulse modulation unit 51. During recording, the gate circuits 51-0 and 51-1 are enabled and two diffracted beams are produced from the A/0 modulator. These beams result in spots on the recording surface which are spaced apart from each other by a center to center distance d indicated by the equation (4) as described previously. Thus, the frequencies of the oscillation circuits 50-0 and 50-1 are so selected that these spots do not overlap with each other but appear at preceding and succeeding positions on the track.

Figure 8:
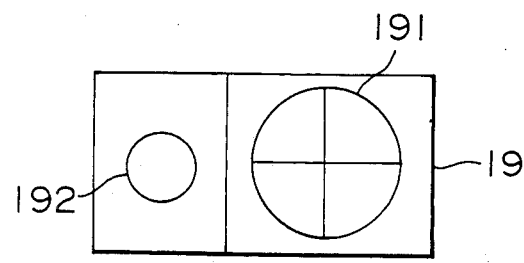
FIG. 8 is a diagram showing a photodetector in the apparatus of FIG. 6.

On condition that, for example, F=4.5 mm, velocity v=3630 m/sec (for PbMoO$_4$) and λ=0.83 μm, Δf is selected to be about 29 MHz for obtaining a center to center spot distance of 30 μm. Consequently, the frequency $f_1$ for read spot is selected to be 171 or 229 MHz when the frequency $f_o$ for record spot is selected to be 200 MHz. In this manner, the record spot and read spot are focused into about 1 μm spots on the disc 20 at preceding and succeeding positions along a pregrooved track 21 on the disc 20, and the tracking control is effected to cause these spots to follow the pregrooved track 21. During recording, the record spot is modulated in its magnitude by the gate circuit 51-0 to have a DC level of about 1 mW. After address information of a desired sector is read, the diffracted beam output is pulse modulated by the gate circuit 51-0 to have a pulse height of several mW in the recording mode to record information on a data field positioned, on the track, subsequent to address information. The recorded information is immediately read by the read spot following the record spot to check whether or not the information has been recorded correctly. In order to prevent the recording film from being changed by the read spot, the read spot is modulated in its magnitude by the gate circuit 51-1 to be maintained at about 1 mW DC level. The generation of the read spot may be prevented at the time other than the recording period. The beam reflected from the disc 20 is returned through the focusing lens 10 and ¼ wavelength plate 8, and deflected at the polarizing beam splitter 7 so as to be directed to a detecting optical system. In this embodiment, the detecting optical system comprises a convex lens 17, a cylindrical lens 18 and a photodetector 19 as shown in FIG. 8. For example, in accordance with a known method (see U.S. Pat. No. 4,293,944) wherein the cylindrical lens 18 is inclined by 45° with respect to the record beam, the focusing error signal and the tracking error signal from four divisional segments 191 within the photodetector 19 are detected. The focusing error signal is fed via a servo circuit 63 and a drive circuit 64 to a magnetic circuit 92 included in a two dimensional actuator 9 and adapted to swing the focusing lens 10 vertically for autofocusing operation whereas the tracking error signal is fed via a servo circuit 60 and a drive circuit 61 to a magnetic circuit 91 of the two dimensional actuator 9 adapted to swing the focusing lens 10 in the tracking direction for performing track follow-up operation. The cumulative signal from the segments 191 is used for reading the address information of the desired sector and the recording signal. The cumulative signal is also fed to the controller via an amplifier 70 and used for decoding the read information. A segment 192, on the other hand, is adapted to receive the read beam and during recording, reads information being recorded. The read information is fed via an amplifier 71 to the controller 100 and used to check errors occuring in the recording mode. The close two spots are separated from each other by the convex lens 17 included in the detecting optical system. When the focusing lens 10 has a focal length F, the convex lens 17 has a focal length F', the center to center spot distance is d and the center to center beam distance is A, A=(F'/F)d is established and F' is selected to be (A/d)F. In this embodiment, a gas laser such as an argon laser may obviously used, attaining the same effect.

As described above, according to the present invention, differently shaped spots and a plurality of spots can be formed by using the single laser light source and the acousto-optic modulator to give rise to such advantages as simplification of the optical system, easy adjustment and prevention of spot position error and consequently, the stably operable and highly reliable optical information recording and reproducing apparatus can be materialized.

What is claimed is:

1. An optical information recording and reproducing apparatus comprising:
    a laser light source;
    an optical system having an acousto-optic modulator receiving a beam from said laser light source and focusing at least one beam from said acousto-optic modulator on an information recording medium;
    a detecting system receiving light reflected from said information recording medium, for detecting a change in quantity of the reflected light; and
    a modulation unit including oscillation means for generating a plurality of signals at different frequencies, modulation means for modulating outputs of said oscillation means and means for adding together outputs of said modulation means and driving said acousto-optic modulator with an output of said adding means so that said acousto-optic modulator produces a plurality of beams which are focused on a track of said information recording medium so as to irradiate a plurality of light spots on different positions along the track.

2. An optical information recording and reproducing apparatus according to claim 1 wherein said information recording medium is made of a recording material from which the recorded information is erasable, said modulation unit applies a plurality of signals at different frequencies to said acousto-optic modulator to cause it to produce said plurality of beams, and specified ones of said plurality of beams are used to form, on said information recording medium, an elliptical spot for erasing the recorded information.

3. An optical information recording and reproducing apparatus according to claim 2 wherein said information recording medium is a chalcogenide family recording film.

4. An optical information recording and reproducing apparatus according to claim 1 wherein said oscillation means includes two oscillation circuits for generating signals at different frequencies, said modulation means includes two gate circuits for modulating outputs of said two oscillation circuits independently, and said acousto-optic modulator generates two beams one of which is used for recording information and the other of which is used for reading the recorded information.

5. An optical information recording and reproducing apparatus according to claim 1, wherein said plurality of beams produced by said acousto-optic modulator include at least one beam for enabling recording of information along the track and at least one other beam for enabling reading of the recorded information along the track.

6. An optical information recording and reproducing apparatus according to claim 1, wherein said plurality of beams produced by said acousto-optic modulator includes at least one beam for enabling recording of information along the track and at least one other beam for enabling erasing of the recorded information along the track.

7. An optical information recording and reproducing apparatus comprising:
a laser light source;
an optical system having an acousto-optic modulator receiving a beam from said laser light source and focusing a beam from said acousto-optic modulator on an information recording medium;
a detecting system receiving light reflected from said information recording medium, for detecting a change in quantity of the reflected light; and
a modulation unit including oscillation means for generating a plurality of signals at different frequencies, modulation means for modulating outputs of said oscillation means and means for adding together outputs of said modulation means and driving said acousto-optic modulator with an output of said adding means;
said laser light source being a semiconductor laser emitting an elliptical beam, and said optical system comprises a lens for making parallel the beam from said semiconductor laser, a first cylindrical lens for constricting the parallel beam in the minor axis direction and transmitting a constricted parallel beam to said acousto-optic modulator, optical means for shaping the beam from said acousto-optic modulator into a circular beam, and a lens for focusing the beam from said optical means on said information recording medium.

8. An optical information recording and reproducing apparatus according to claim 7 wherein said optical means comprises a second cylindrical lens having the same characteristic as that of said first cylindrical lens, and a beam shaper for shaping the beam from said second cylindrical lens into the circular beam.

9. An optical information recording and reproducing apparatus according to claim 7 wherein said optical means comprises a second cylindrical lens having a focal length which is a multiple of a focal length of said first cylindrical lens by an aspect ratio of said elliptical beam.

10. An optical information recording and reproducing apparatus having a laser light source and an optical system so that a beam from said laser light source is irradiated through said optical system on an information recording medium to record, reproduce and erase information, characterized in that there are provided an acousto-optic modulator disposed in said optical system for receiving the beam from said laser light source, and a modulation unit including oscillation means for generating a plurality of signals at different frequencies, modulation means for modulating outputs of said oscillation means and means for adding together outputs of said modulation means, that said modulation unit applies the plurality of signals at different frequencies to said acousto-optic modulator to cause it to produce a plurality of beams, and that specified ones of said plurality of beams are used to form, on said information recording medium, an elliptical spot for erasing the recorded information.

11. An optical information recording and reproducing apparatus according to claim 10 wherein said information recording medium is a chalcogenide family recording film.

12. An optical information recording and reproducing apparatus according to claim 10 wherein said plurality of beams from said acousto-optic modulator form, on said information recording medium, said elliptical spot and a circular spot spaced apart therefrom.

13. An optical information recording and reproducing apparatus according to claim 13 wherein said laser light source is a semiconductor laser emitting an elliptical beam, and said optical system comprises a lens for making parallel the beam from said semiconductor laser, a first cylindrical lens for constricting the parallel beam in the minor axis direction and transmitting a constricted parallel beam to said acousto-optic modulator, optical means for shaping the beam from said acousto-optic modulator into a circular beam, and a lens for focusing the beam from said optical means on said information recording medium.

14. An optical information recording and reproducing apparatus according to claim 13 wherein said optical means comprises a second cylindrical lens having the same characteristic as that of said first cylindrical lens, and a beam shaper for shaping the beam from said second cylindrical lens into the circular beam.

15. An optical information recording and reproducing apparatus according to claim 13 wherein said optical means comprises a second cylindrical lens having a focal length which is a multiple of a focal length of said first cylindrical lens by an aspect ratio of said elliptical beam.

16. An optical information recording and reproducing apparatus having a laser light source and an optical system so that a beam from said laser light source is irradiated through said optical system on an information recording medium to record, reproduce and erase information, characterized in that there are provided an acousto-optic modulator disposed in said optical system for receiving the beam from said laser light source, and a modulation unit including oscillation means for generating at least two signals at different frequencies, modulation means for modulating outputs of said oscillation means independently and means for adding together outputs of said modulation means, that said modulation unit applies signals at at least two different frequencies to said acousto-optic modulator to cause it to produce at least two beams one of which forms, on said information recording medium, a spot for recording information and the other of which forms, on said information recording medium, a spot spaced apart from the information recording spot and used for reading the recorded information.

17. An optical information recording and reproducing apparatus according to claim 16 wherein said oscillation means includes at least two oscillation circuits for generating signals at different frequencies, said modulation means includes at least two gate circuits for modulating outputs of said at least two oscillation circuits independently, and one of said gate circuits is driven by a pulse indicative of information to be recorded and the other is DC driven.

18. An optical information recording and reproducing apparatus according to claim 16 wherein said laser light source is a semiconductor laser emitting an elliptical beam, and said optical system comprises a lens for making parallel the beam from said semiconductor laser, a first cylindrical lens for constricting the parallel beam in the minor axis direction and transmitting a constricted parallel beam to said acousto-optic modulator, optical means for shaping the beam from said acousto-optic modulator into a circular beam, and a lens for focusing the beam from said optical means on said information recording medium.

19. An optical information recording and reproducing apparatus according to claim 18 wherein said optical means comprises a second cylindrical lens having the same characteristic as that of said first cylindrical lens, and a beam shaper for shaping the beam from said second cylindrical lens into the circular beam.

20. An optical information recording and reproducing apparatus according to claim 18 wherein said optical means comprises a second cylindrical lens having a focal length which is a multiple of a focal length of said first cylindrical lens by an aspect ratio of said elliptical beam.

* * * * *